(12) United States Patent
Subbian et al.

(10) Patent No.: US 8,230,349 B2
(45) Date of Patent: Jul. 24, 2012

(54) INTRA OPERATOR FORENSIC META DATA MESSAGING

(75) Inventors: Deepakumar Subbian, Bangalore (IN); Aditya Shrivastava, Bangalore (IN); Jagadish Annadurai, Bangalore (IN); Uvaraj Thangarajan, Bangalore (IN); Arun Pattali, Bangalore (IN); Bouna Praveenkumar, Bangalore (IN); Marine Drive, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 985 days.

(21) Appl. No.: 12/026,266

(22) Filed: Feb. 5, 2008

(65) Prior Publication Data
US 2009/0172554 A1    Jul. 2, 2009

Related U.S. Application Data

(60) Provisional application No. 61/017,971, filed on Dec. 31, 2007.

(51) Int. Cl.
*G06F 3/00* (2006.01)
*G06F 3/01* (2006.01)

(52) U.S. Cl. ........ 715/751; 715/733; 715/736; 715/738; 715/756; 715/757; 382/103

(58) Field of Classification Search .................. 715/733, 715/734, 736, 738, 751, 773, 744, 757, 756, 715/863; 709/204, 207; 382/103
See application file for complete search history.

(56) References Cited

U.S. PATENT DOCUMENTS

| | | | |
|---|---|---|---|
| 6,574,674 B1 | 6/2003 | May et al. | |
| 7,236,529 B2 * | 6/2007 | Lin et al. | 375/240.2 |
| 7,577,636 B2 * | 8/2009 | Fernandez | 1/1 |
| 7,599,963 B2 * | 10/2009 | Fernandez | 1/1 |
| 2004/0260669 A1 * | 12/2004 | Fernandez | 707/1 |
| 2005/0254440 A1 * | 11/2005 | Sorrell | 370/264 |
| 2006/0087987 A1 * | 4/2006 | Witt et al. | 370/260 |
| 2006/0168637 A1 * | 7/2006 | Vysotsky et al. | 725/116 |
| 2008/0163287 A1 * | 7/2008 | Fernandez | 725/31 |

* cited by examiner

*Primary Examiner* — Nicholas Augustine
(74) *Attorney, Agent, or Firm* — Husch Blackwell

(57) ABSTRACT

The inventive system and method for enabling interactive collaboration among video surveillance operators is presented. The device has a message including an incident or meta data having a source identifier, a meta data composer, a transport layer, and a display device, such that the message is packaged using the meta data composer and transmitted using the transport layer to the display device. One embodiment facilitates sharing using a common console, and the other facilitates sharing to one or more operators; both embodiments use a common Meta Data messaging mechanism. Meta data refers to any surveillance related data that is worthy of sharing between operators. It includes, but is not necessarily limited to, salvo information, camera, incident related data, video device location details, etc.

8 Claims, 8 Drawing Sheets

Before Sending

After Sending

INTRA OPERATOR FORENSIC META DATA MESSAGING

CROSS REFERENCE TO RELATED APPLICATION

The present application claims benefit of U.S. Provisional Application No. 61/017,971 filed on Dec. 31, 2007.

FIELD OF THE INVENTION

This invention relates generally to video surveillance in accordance with a security system. In particular, this invention relates to sharing video surveillance information among multiple operators simultaneously.

BACKGROUND OF THE INVENTION

In video surveillance, multiple operators view one or more monitors or video screens, watching for particular activities, abnormalities and other events. When an event occurs, an operator may have to report it, and the operator may wish to interact and/or collaborate with other operators to determine suspects, objects and/or other items of interests. Each operator generally views video in "salvo" or in a salvo layout, that is, in a logical arrangement of video panels, monitors or cameras. When a first operator wants to notify a second operator about a camera the first operator is viewing, he must contact the second operator using convention methods, such as telephone, intercom, or on-line chat feature.

U.S. Pat. No. 6,574,674, Method and System for Managing Data while Sharing Application Programs, May et al., discloses a method and system for managing data or objects shared by multiple instances of a shared application program. The information is shared using an Object Management (OM) system that manages shared data for multiple application programs. The data is stored in a shared data pool that is controlled by the OM. Hence, all the applications access the shared data pool. No data is messaged from one application or user to another. Instead, each user's computer has its own copy of the shared data pool.

Among the problems of the aforementioned systems is the lack of an effective communication infrastructure among video surveillance operators. Information initially viewed by one operator on a particular camera or video screen can only be shared with others through conventional contact methods in conjunction with a common data pool.

SUMMARY OF THE INVENTION

The present invention advantageously provides interactive live video exchange messaging, in which operators can send their entire salvo as a message to other operators, making sharing of scenes and incidents seamless. The recipient, on opening the message, sees the same salvo as the sender, with the same Pan Tilt Zoom (PTZ) settings on the camera, for both live and recorded video footage. Thus the context of each different operator can be shared seamlessly across different physical locations, achieving location transparency. Operators are able to quickly assess situations and/or incidents, and respond in a timely fashion. In addition to video, images, clips, maps, alarms, and other items can be distributed among multiple operators simultaneously.

The inventive system and method for enabling interactive collaboration among video surveillance operators is presented. The device has an incident having a source identifier, a meta data composer, a transport layer, and a display device, such that the incident is packaged using the meta data composer and transmitted using the transport layer to the display device.

The foregoing and other objects, aspects, features, advantages of the invention will become more apparent from the following description and from the claims.

BRIEF DESCRIPTION OF THE DRAWINGS

The invention is farther described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution is presented to the need for interactive, live sharing of video and notes between or among video surveillance operators. The inventive solution includes a device that allows a recipient operator to be notified by a sending operator about a specific camera or video monitor that he is watching. The notification can be done using a message having Meta data embedded, enabling the recipient operator to access the same specific camera in his viewer, e.g. a common console or his individual video monitor. Accordingly, the salvo layout or current cameras being watched by a sending operator can be sent as a message to a receiving operator. In addition, a rectangle or a circle can be placed, along with notes, on the current video. The resulting annotated message can be simultaneously transmitted to multiple recipient operators, who can drag and/or drop this message to recreate the video and/or geometry overlay that corresponds to that of the sender. Thus, not only videos but also comments regarding the videos, and particular activities on specific video monitors, can be shared among multiple operators simultaneously.

Two embodiments of the invention are presented in detail for illustrative purposes. One embodiment facilitates sharing using a common console, and the other facilitates sharing to one or more operators; both embodiments use a common Meta Data messaging mechanism. Meta data refers to any surveillance related data that is worthy of sharing between operators. It includes, but is not necessarily limited to, salvo information, camera, incident related data, video device location details, etc. However, as would be understood by one of ordinary skill in the art, the systems and methods described below may include various other structures and/or processes in actual implementation consistent with aspects of the present invention.

Figure 1A:
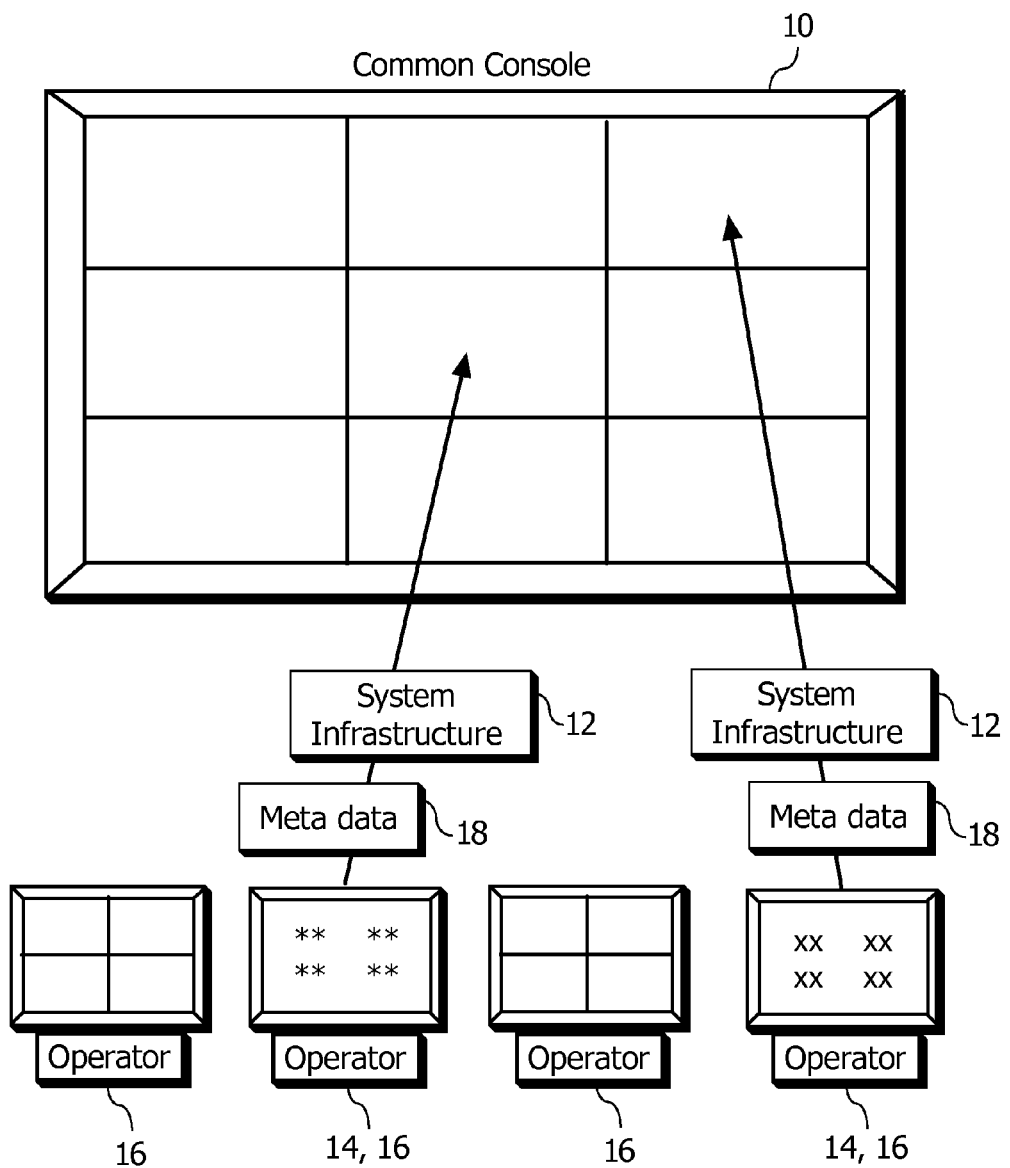
FIG. 1A is a schematic "before" diagram of an embodiment of the present invention.
Figure 1B:
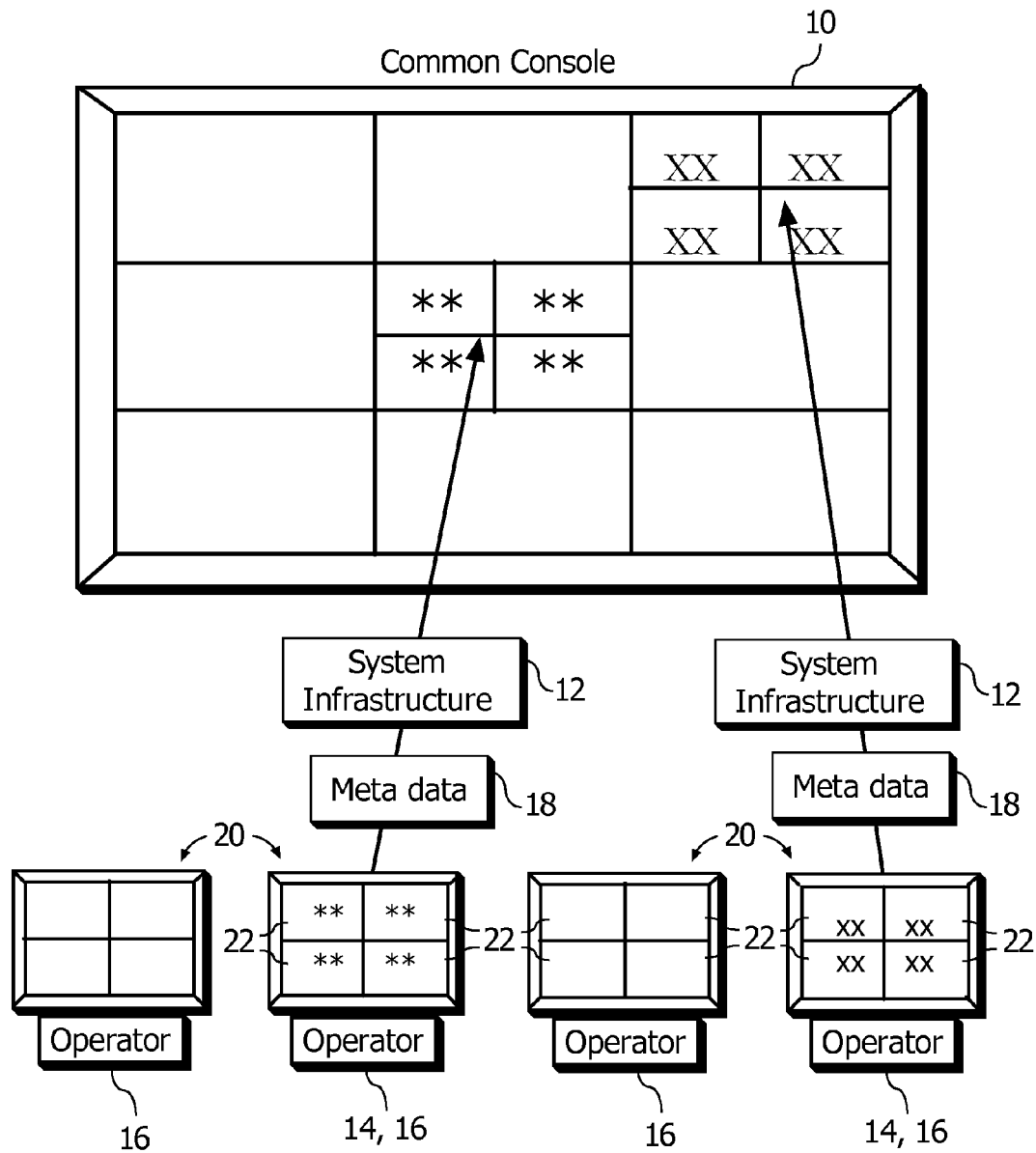
FIG. 1B is a schematic "after" diagram of the embodiment shown in FIG. 1A.

FIGS. 1A and 1B illustrate one embodiment of the invention. In this embodiment, information is communicated using a common console 10. FIG. 1A shows the common console 10 and operators 14, 16 before any data is sent to the common console 10. Each operator views a salvo layout 20 comprising one or more cameras 22 Using the system infrastructure 12, a sending operator 14 sends the console Meta data 18 of his salvo 20 to the common console 10 that receives and displays this Meta data 18. The system infrastructure 12 consists of the software, hardware and communication layers/interfaces that enable transmission of Meta data 18 between two entities. Meta data 18 is described in more detail below. Other operators 16 capable of seeing the common console 10 can view the sending operator's Meta data 18. FIG. 1B shows the common console 10 after it receives Meta data 18 and displays it, enabling other operators 16 to see it.

Figure 2:
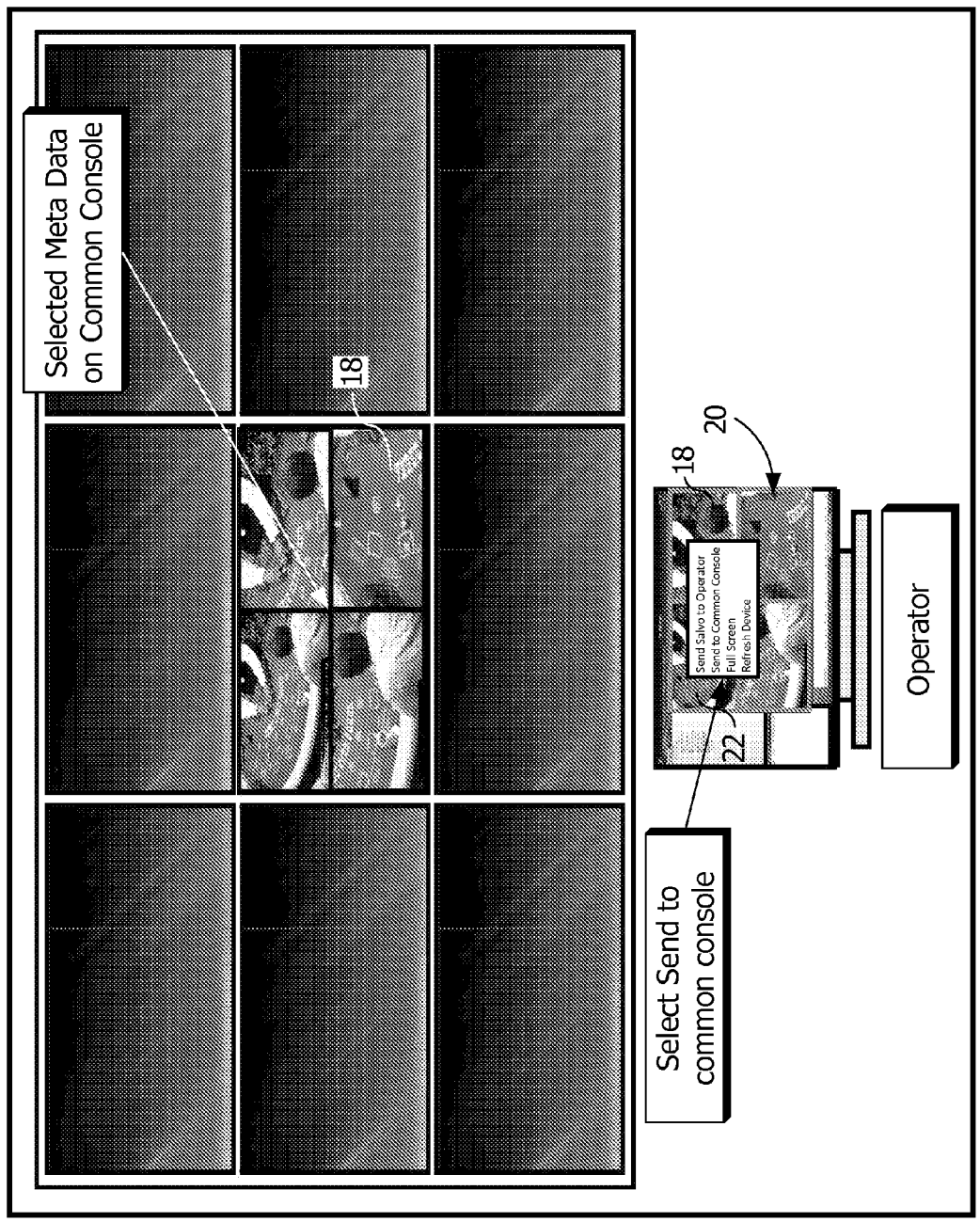
FIG. 2 is an example of the embodiment shown in FIG. 1A.

FIG. 2 illustrates this exemplary embodiment. An operator 14 views a salvo layout 20 and recognizes an event on a camera 22 that should be shared with other operators 16, so the operator 14 decides to transmit this salvo 20. The operator 14 selects the salvo 20, which is converted to Meta data 18, and then sent to and displayed on the common console 10.

Figure 3:
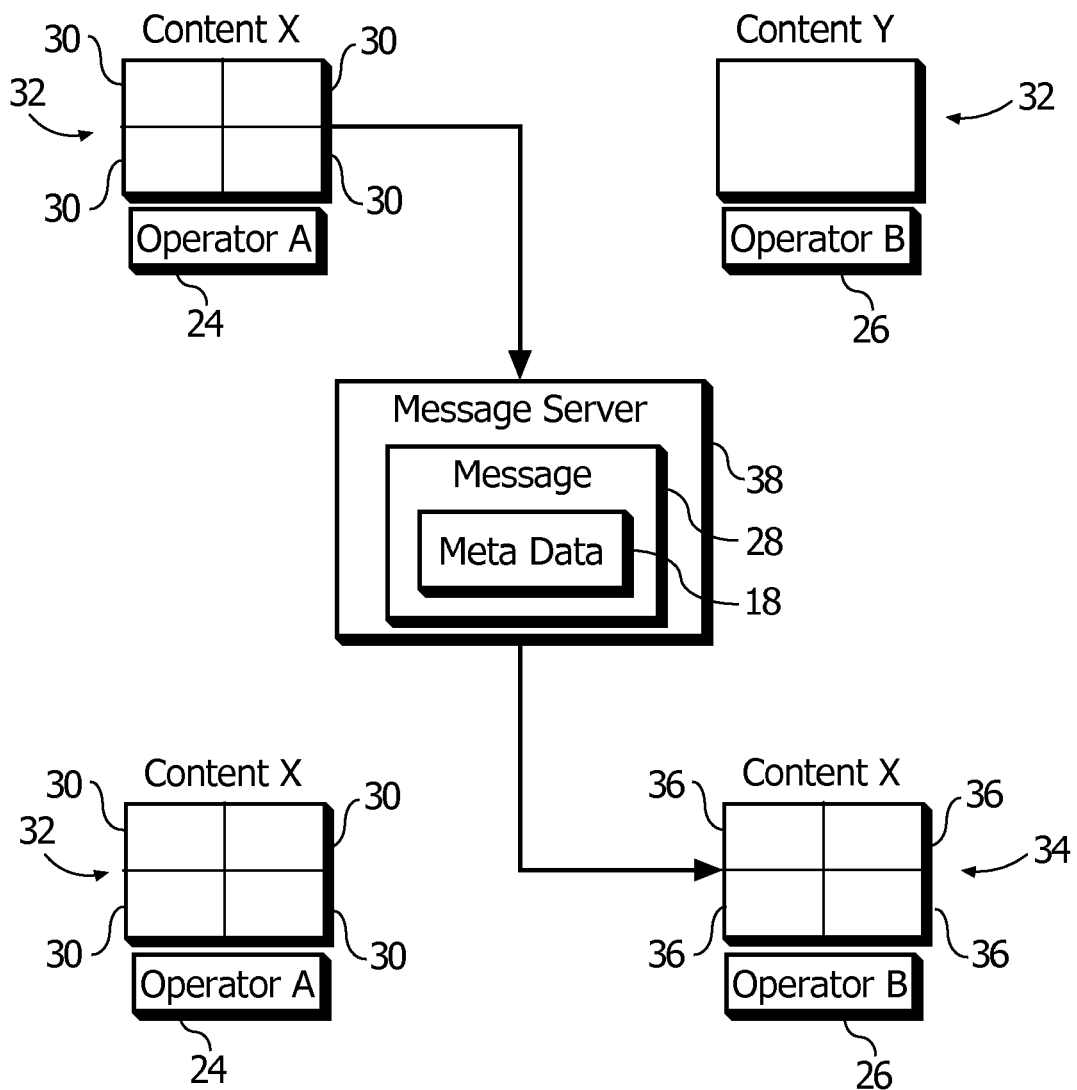
FIG. 3 is a block diagram of another embodiment of the present invention.

In another embodiment, illustrated in a block diagram in FIG. 3, operator A 24 and operator B 26 can share incident data or Meta data 18 between each other. An event or incident observed by operator A 24 can be sent as Meta data 18 within a Meta Data Composition or message 28 to one or more operators 26 who shall be able to receive and view the Meta data 18. If appropriate, operator B, for example, can take action in response to the received Meta data 18.

Figure 4:
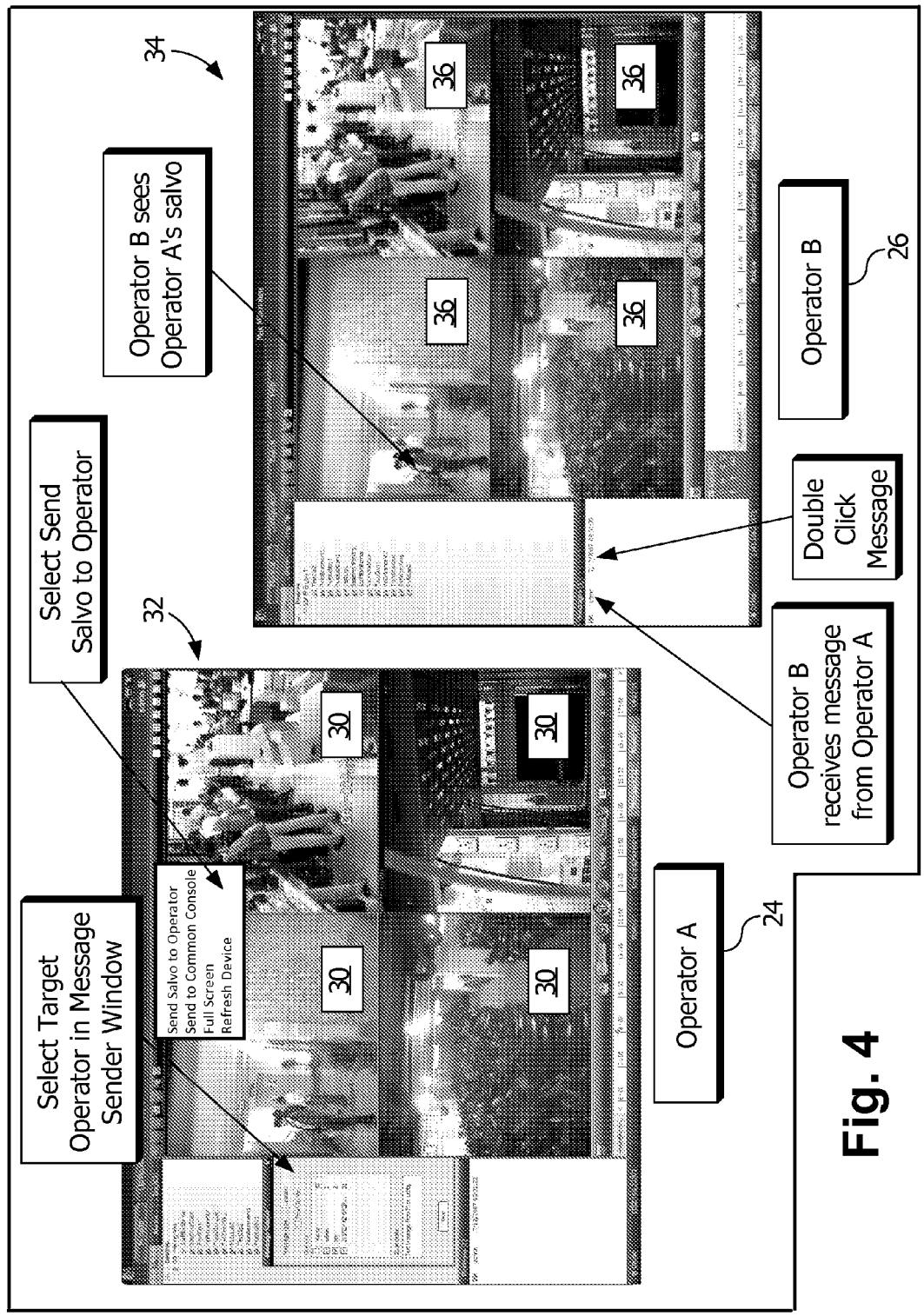
FIG. 4 is an example of the embodiment shown in FIG. 3.

FIG. 4 illustrates the process of sending an incident or Meta data 18 within a message 28 from one operator 24 to one or more operators 26. When a sending operator 24 observes an incident or event that he wants to share with other operators 26, the sending operator 24 will mark, typically by performing a "right click" computer mouse operation, on the camera 30 of the salvo 32 displaying the incident, select "Send Message" and choose one or more operators 26 from the list of available operators 26 and press send. In addition to "right click", other techniques known in the art for selecting data can be used. The Meta data 18 sufficient to recreate the camera display 30 of the salvo 32 on the destination or receiver's monitor 34 is packaged and sent as a message 28 to a Message Server 38. This server 38 routes the message 28 to all the destination viewers or receivers' monitors 34 that the recipient operator 26 is logged on. As discussed above, these recipient operators 26 are selected from the list of available operators 26 by the sending operator 24. Each chosen operator 26 can view the message 28, including any notations provided by the sending operator 24, on the appropriate camera 36 of the chosen operator's salvo 34.

Figure 5:
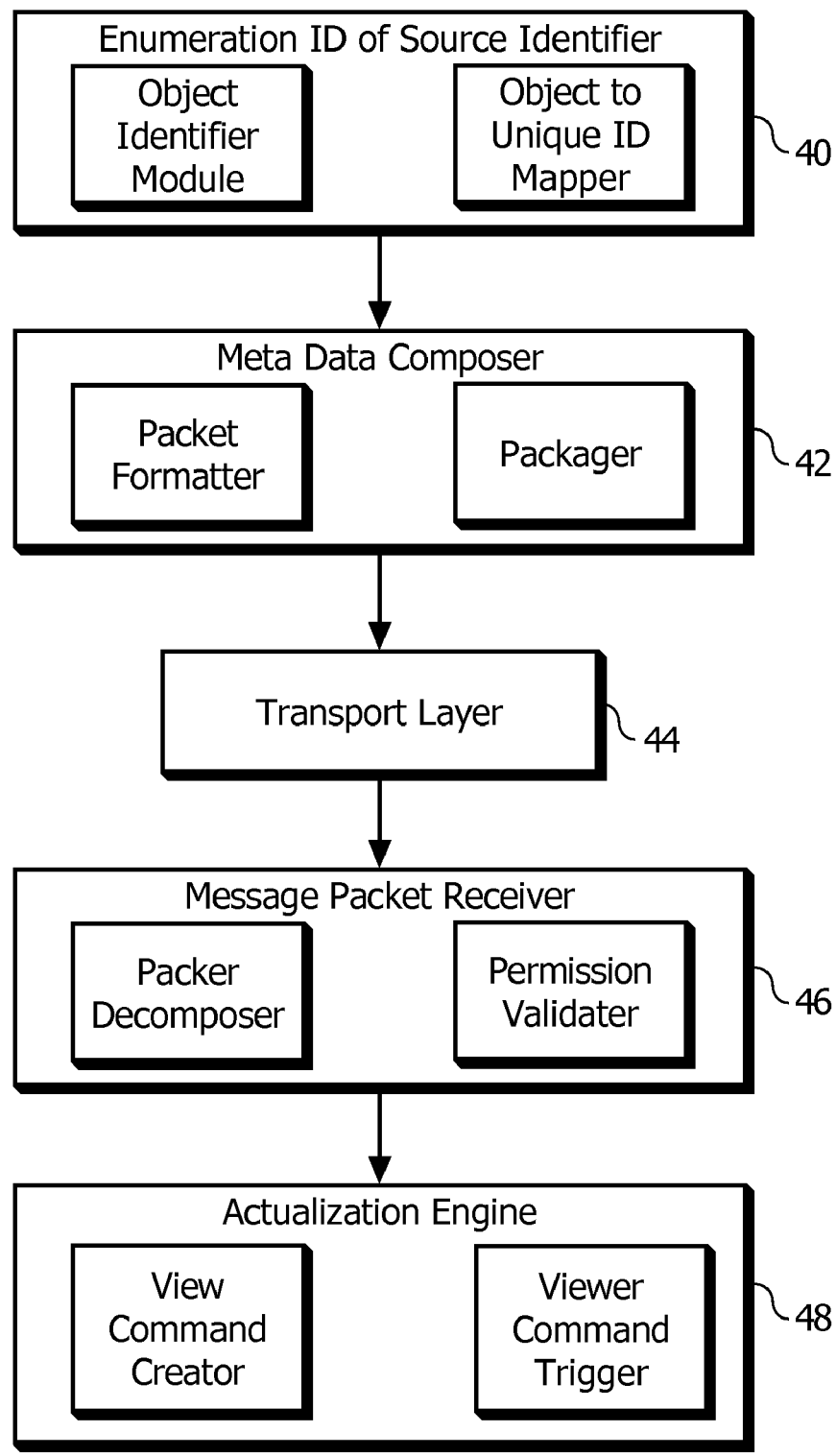
FIG. 5 is a block diagram of components of an embodiment of the invention.

Exemplary details for implementing this embodiment are illustrated in FIG. 5, but other particular details may be substituted as is known in the art. When the sending operator 24 elects to report an incident and send particulars as a message 28, the enumeration identification of the source 40 is determined and a module that gets Meta data 18 for the message 28, e.g. camera 30, is created. This module can be an object identifier module. A sequence number to uniquely identify the message 28 is established, for example using an object to unique ID mapper. A Meta Data Composer 42 receives the data that the operator wants to share, e.g. salvo with video, email, notation, etc., from the enumeration identification source 40 and creates a message packet using packager and a packet formatter. The packager can compose the Meta data 18 associated with an incident or event into a generic structure that is understandable by the receiver. The packet formatter can format the Meta data 18 and frame a physical layer packet ready to be transmitted by the transport layer 44. For example, the packager can create physical layer packets based on the desired mode of transport selected, e.g.: TCP, Serial, etc. The packet is transported over a transport layer 44.

After transport, the Meta data 18 is received and unpacked by a Message Packet Receiver 46. A module, for example a packer decomposer, can be used to unscramble the message 28, and a permission validater, for example, can be used to check whether the destination operator 26 has the privilege to view the message 28. An Actualization Engine 48 having a equivalent command to be used by the viewer or receiver's monitor 34 can be created a view command creator, while a message used by the viewer processing engine to display the camera 36 can be created by a viewer command trigger. The Actualization Engine 48 is also capable of sending information to the transport layer 44. The information could be either new Meta data 18 or a response to the received Meta data 18.

Figure 6:
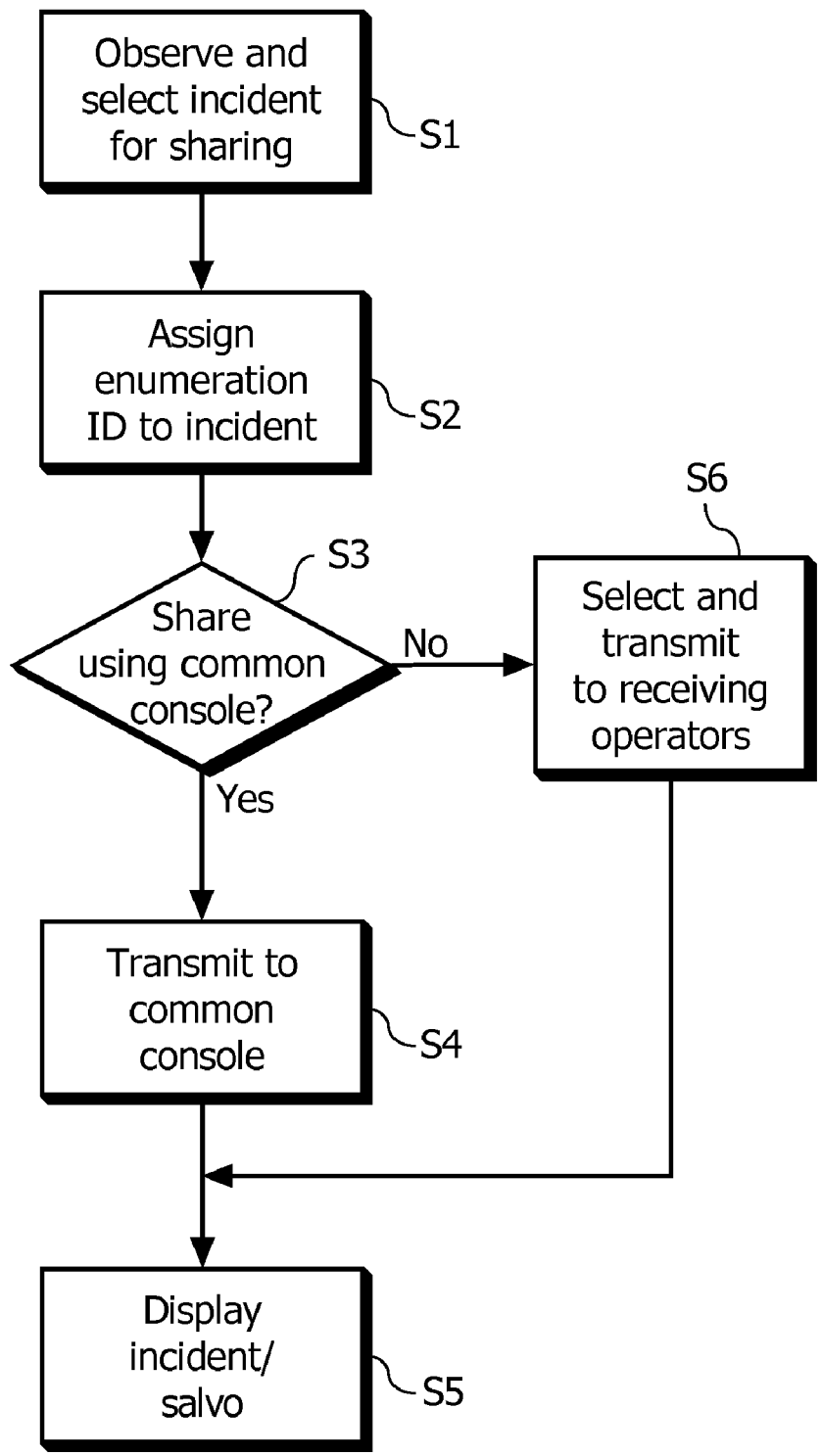
FIG. 6 is a flow diagram of the invention.

The flow of the inventive process is described and illustrated in FIG. 6. In step S1, an incident is observed and selected for sharing with other operators 16, 26. Once selected, in step S2, the incident is assigned an enumeration ID to identify its source. If the incident is to be shared via a common console 10 (step S3=YES), the incident is transmitted to the common console 10 in step S4. Otherwise, if step S3=NO, one or more operators 16, 26 to receive the incident are selected the incident is transmitted to these receiving operators 16, 26 in step S6. In step S5, the incident is displayed.

Figure 7:
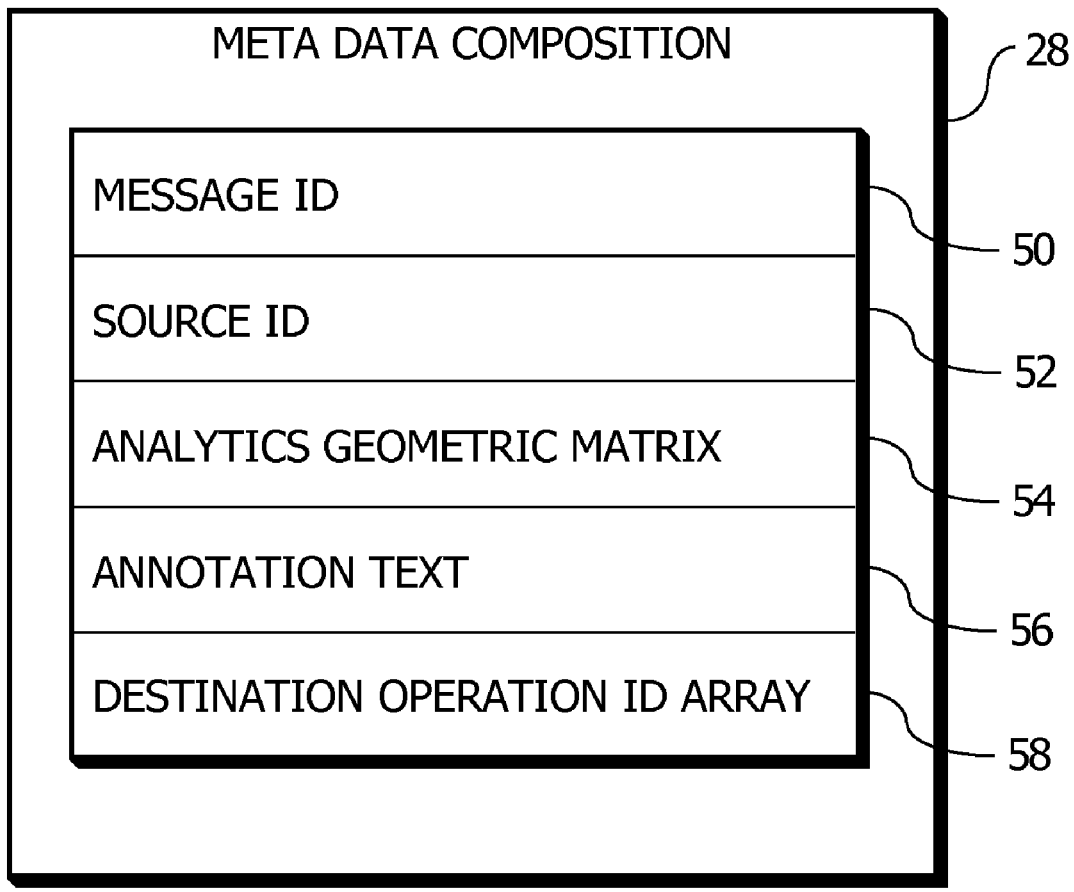
FIG. 7 is an example of a Meta data structure.

A typical Meta Data Composition or message 28, shown in FIG. 7, contains the following information. Message ID 40 having an automatically generated identification code (ID) to identify the message uniquely; SourceID 42 having an ID of the selected camera or monitor; AnalytiesGeometryMatrix 44 having any circle and/or rectangle coordinates drawn on the image; AnnotationText 46 having notes written along with the message being sent; DestinationOperatorIDArray 48 having ID(s) of the operators who are the recipients of the message.

The messages 28 can be recorded and reports can be generated to reflect issues in the site, and/or effectiveness of operators 24, 26. Further, situational awareness can be enhanced by sending the message 28 as SMS, MMS, e-mail, FAX. In one embodiment, operators 24, while coming across a specific incident, can send a "self-message" to themselves to store for future reference.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A device enabling interactive collaboration among video surveillance operators, said device comprising:
   an enumeration identification source for obtaining meta data sufficient to recreate a video display of an incident;
   a meta data composer for creating a message said message including the meta data sufficient to recreate the video display of the incident;
   a transport layer for transmitting said message, including said meta data sufficient to recreate said video display of said incident, to a display device; and
   the display device for displaying said message, including said meta data sufficient to recreate the video display of the incident, wherein the message is packaged using the meta data composer and transmitted using the transport layer to the display device, wherein the packaged message comprises a message ID, a source ID, an analytics geometric matrix, annotation text, and a destination operation ID array;

and wherein the display device comprises an actualization engine having commands for displaying the message, including the meta data sufficient to recreate the video display of the incident on the display device.

2. The device according to claim 1, wherein the display device comprises a message packet receiver for unpackaging and validating the incident.

3. The device according to claim 1, wherein the display device is one of a common console, and an operator console.

4. The device according to claim 1, wherein the display device is determined based on the destination operation ID array.

5. A method for enabling interactive collaboration among video surveillance operators, said method comprising the steps of:
   creating a message having an incident for sharing, said message including meta data sufficient to recreate a video display of said incident;
   assigning an enumeration identifier to said message including the meta data sufficient to recreate the video display of said incident;
   packaging and transmitting said message, including said meta data sufficient to recreate the Video display of said incident, to a display device, wherein the packaged message comprises a message ID, a source ID, an analytics geometric matrix, annotation text, and a destination operation ID array; and
   displaying said message, including said meta data sufficient to recreate the video display of said incident, on said display device, wherein the display device comprises an actualization engine having commands for displaying the message, including the meta data sufficient to recreate the video display of said incident, on the display device.

6. The method according to claim 5, wherein the display device unpackages and validates the message.

7. The method according to claim 5, wherein the display device is one of a common console, and an operator console.

8. The method according to claim 1, wherein the display device is determined based on the destination operation ID array.

* * * * *